(12) United States Patent
Chien et al.

(10) Patent No.: US 11,644,672 B2
(45) Date of Patent: May 9, 2023

(54) HOLOGRAPHIC DISPLAY DEVICE

(71) Applicant: HON HAI PRECISION INDUSTRY CO., LTD., New Taipei (TW)

(72) Inventors: Tsai-Yi Chien, New Taipei (TW); Te-En Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 345 days.

(21) Appl. No.: 17/038,120

(22) Filed: Sep. 30, 2020

(65) Prior Publication Data

US 2021/0364801 A1    Nov. 25, 2021

(30) Foreign Application Priority Data

May 22, 2020  (CN) .......................... 202010444326.9

(51) Int. Cl.
*G02B 27/01* (2006.01)
*F21V 8/00* (2006.01)

(52) U.S. Cl.
CPC ......... *G02B 27/0172* (2013.01); *G02B 6/005* (2013.01); *G02B 6/0026* (2013.01); *G02B 2027/0116* (2013.01); *G02B 2027/0174* (2013.01)

(58) Field of Classification Search
CPC .. G02B 27/0172; G02B 6/0026; G02B 6/005; G02B 2027/0116; G02B 2027/0174
USPC .......................................................... 359/13
See application file for complete search history.

(56) References Cited

U.S. PATENT DOCUMENTS

| 5,854,697 A * | 12/1998 | Caulfield ............. G03H 1/0408 385/32 |
| 7,453,612 B2 * | 11/2008 | Mukawa ............ G02B 27/0081 359/34 |
| 2004/0156299 A1 * | 8/2004 | Sakai ..................... G11B 7/1353 |
| 2006/0221448 A1 | 10/2006 | Nivon et al. |
| 2015/0177443 A1 * | 6/2015 | Faecke ................. G02B 6/0035 362/607 |
| 2015/0192725 A1 * | 7/2015 | Facke ..................... G02B 6/005 362/606 |
| 2019/0094447 A1 * | 3/2019 | Tan ........................ G02B 6/002 |
| 2019/0146221 A1 * | 5/2019 | Oku .......................... H04N 5/64 359/13 |
| 2021/0165216 A1 * | 6/2021 | Takagi ............... G02B 27/0172 |

(Continued)

FOREIGN PATENT DOCUMENTS

| CN | 101151562 A | 3/2008 |
| CN | 104777535 A | 7/2015 |

(Continued)

*Primary Examiner* — Collin X Beatty
(74) *Attorney, Agent, or Firm* — ScienBiziP, P.C.

(57) ABSTRACT

A holographic display device with reduced color shifting in relation to different colors includes a display panel and a diffraction component. The display panel emits a first color light having a first emission efficiency and a second color light having a second emission efficiency. The first emission efficiency is greater than the second emission efficiency. The diffraction component on an optical path of the first and second colors of light diffracts the first color light at a first diffraction efficiency and the second color light at a second diffraction efficiency to generate a holographic image, the first diffraction efficiency is less than the second diffraction efficiency.

17 Claims, 2 Drawing Sheets

(56) References Cited

U.S. PATENT DOCUMENTS

2021/0223549 A1* 7/2021 Maimone ............ G02B 27/0093
2021/0397002 A1* 12/2021 Tseng ....................... G02B 5/32

FOREIGN PATENT DOCUMENTS

CN 107003528 A 8/2017
WO WO-2018043254 A1 * 3/2018 ............. B60K 35/00

* cited by examiner

HOLOGRAPHIC DISPLAY DEVICE

FIELD

The subject matter herein generally relates to image display, and more particularly to a holographic display device.

BACKGROUND

A holographic display method combines holographic technology and waveguide technology to superimpose a virtual image and an image of an external scene as projections.

The holographic display method applies in holographic displays. A head-mounted holographic display can be worn on user's head for displaying three-dimensional holographic images for the user. The holographic images are generated from diffracting light from sources. The source light includes multiple colors of light. Diffraction efficiencies of multiple colors of light are different, thereby resulting in a color shift of the holographic images.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
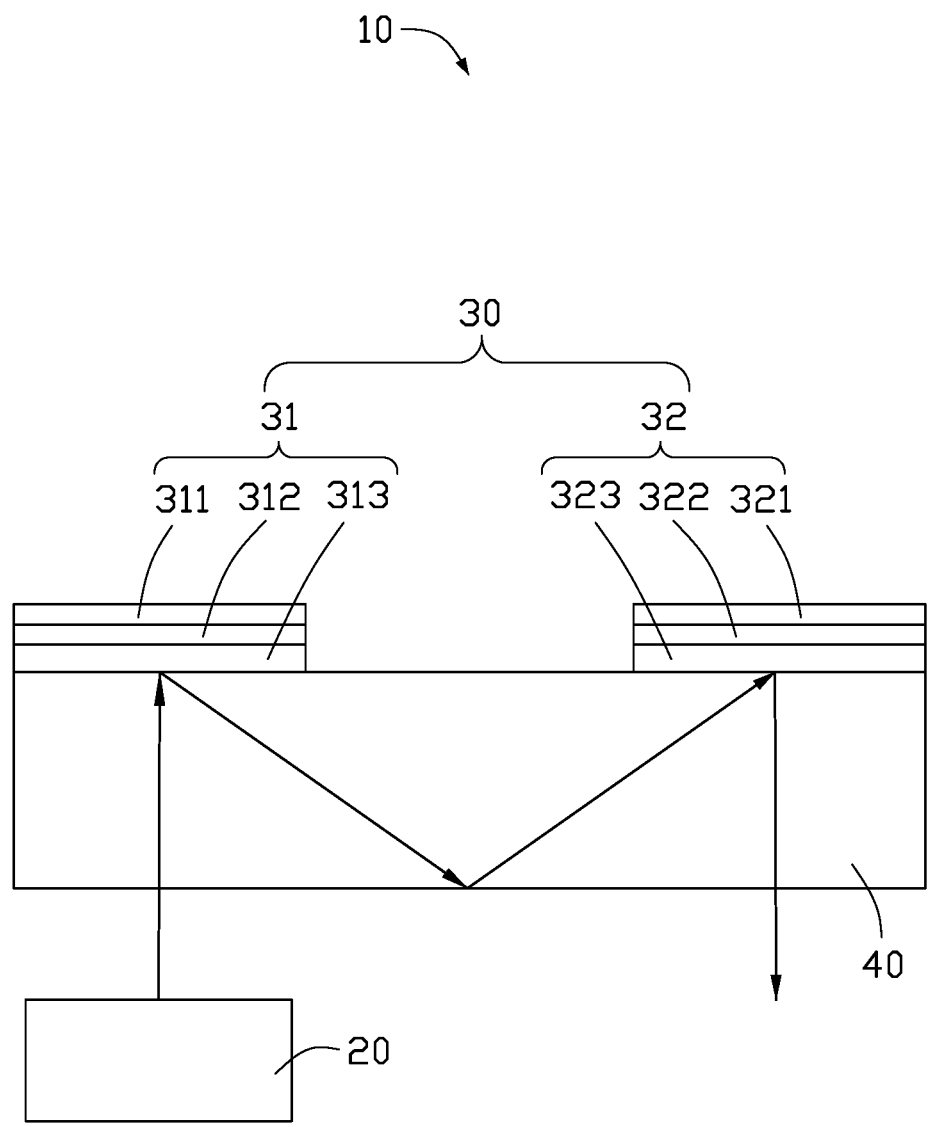
FIG. 1 is a schematic diagram of a holographic display device according to an embodiment of the present disclosure.

It will be appreciated that for simplicity and clarity of illustration, where appropriate, reference numerals have been repeated among different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

The present disclosure provides a holographic display device 10. The holographic display device 10 is a head-mounted holographic display device. The holographic display device 10 can display three-dimensional holographic images. The holographic images can be seen when the holographic display device 10 is worn on a user's head.

FIG. 1 illustrates the holographic display device 10. The holographic display device 10 includes a display panel 20, a diffraction component 30, and an optical waveguide 40 between the display panel 20 and the diffraction component 30.

The display panel 20 emits image light for displaying two-dimensional images. The image light includes a first color light, a second color light, and a third color light. In this embodiment, the first color light is blue light, the second color light is green light, and the third color light is red light. In other embodiments of the disclosure, the image light may include light in other colors.

The diffraction component 30 is configured to diffract the first color light, the second color light, and the third color light. The first color light, the second color light, and the third color light diffracted by the diffraction component 30 function together to display three-dimensional holographic images.

The optical waveguide 40 is on an optical path of the first color light, the second color light, and the third color light. The optical waveguide 40 is a light propagation medium configured to guide the first color light, the second color light, and the third color light between the display panel 20 and the diffraction component 30. In the present embodiment, the optical waveguide 40 may be made of transparent optical glass or optical plastic.

Figure 2:
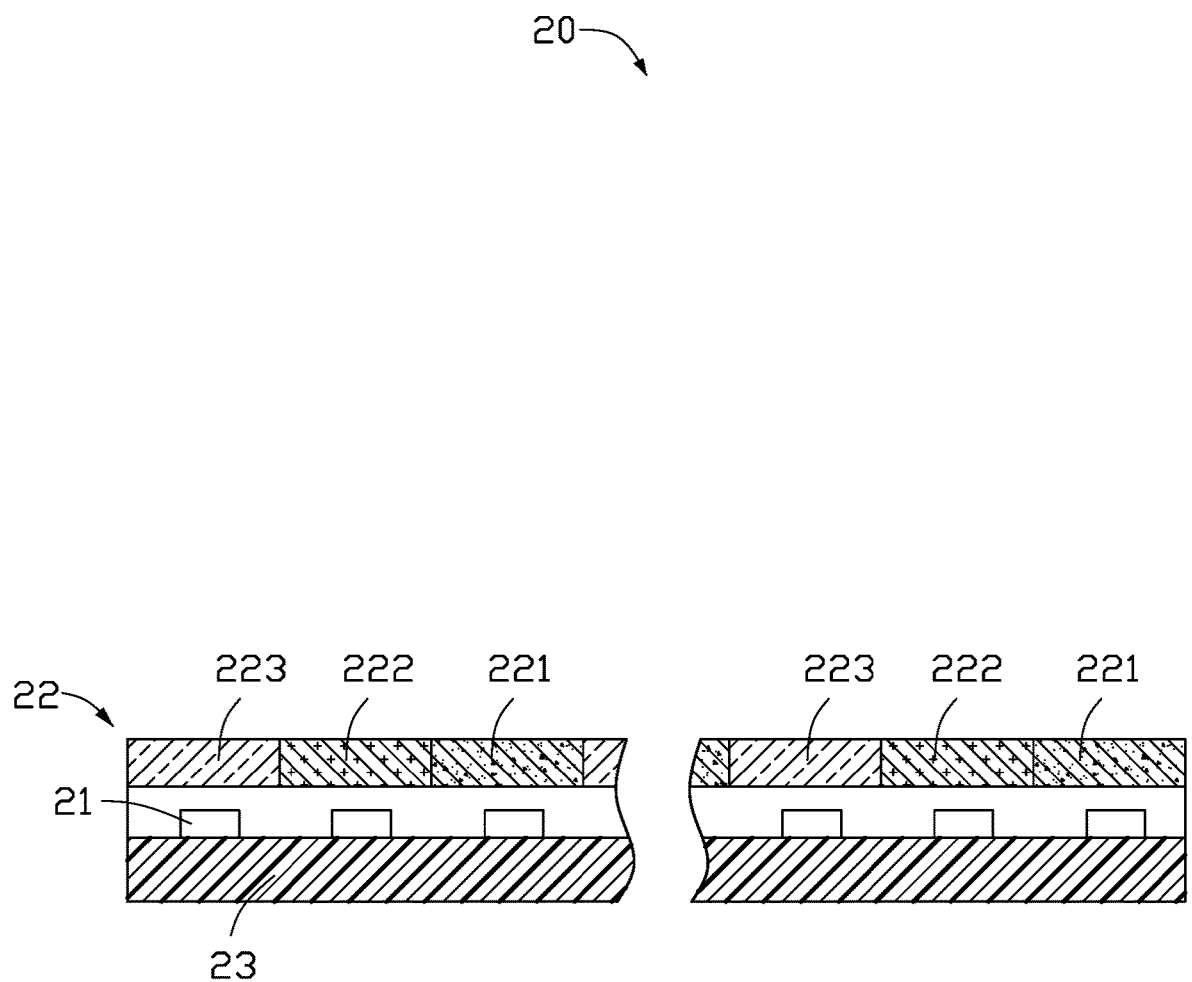
FIG. 2 is a schematic diagram of a display panel of the holographic display device of FIG. 1.

Referring to FIG. 2, the display panel 20 includes a substrate 23 and a plurality of light emitting elements 21 on a surface of the substrate 23. Each of the plurality of light emitting elements 21 is configured to emit the first color light. In the present embodiment, each of the plurality of light emitting elements 21 is a micro light-emitting diode, wherein each of the plurality of light emitting elements 21 is configured to emit blue light.

Referring to FIG. 2, the display panel 20 further includes a color conversion layer 22 on an optical path of the first color light. The color conversion layer 22 converts a part of the first color light into the second color light and the third color light. The remaining first color light is transmitted out from the color conversion layer 22. In the present embodiment, the color conversion layer 22 includes quantum dots for converting the part of the first color light into the second color light and the third color light.

The display panel 20 may include other components, but only components related to the present disclosure are described.

The color conversion layer 22 includes a plurality of first conversion films 221, a plurality of second conversion films 222, and a plurality of transmission films 223. Quantum dots in the first conversion films 221 are different from quantum dots in the second conversion films 222. The transmission films 223 do not include any quantum dots. Different types of quantum dots convert the part of the first color light into different colors of light. Thereby, each of the first conversion films 221 is configured to convert a part of the first color light into the second color light, each of the second conversion films 222 is configured to convert a part of the first color light into the third color light, and each of the transmission films 223 is configured to transmit out the unconverted part of the first color light.

The first color light, the second color light, and the third color light are emitted from the color conversion layer 22. The first color light is directly emitted from the transmission film 223 without color conversion, while the second color light and the third color light are converted from the part of the first color light emitted by the plurality of light emitting elements 21. In this arrangement, a first emission efficiency of the first color light is greater than a second emission efficiency of the second color light and a third emission efficiency of the third color light. The emission efficiency is defined as an emission efficiency of the plurality of light emitting elements 21. A color conversion efficiency of the quantum dots in each of the first conversion films 221 is greater than a color conversion efficiency of the quantum dots in each of the second conversion films 222, so the second emission efficiency is greater than the third emission efficiency.

A first intensity of the first color light from the display panel 20 is defined as $A_1$. A second intensity of the second color light from the display panel 20 is defined as $A_2$. A third intensity of the third color light from the display panel 20 is defined as $A_3$. The characteristics $A_1$-$A_3$ are measured when the plurality of light emitting elements 21 is driven by a predetermined driving voltage. The emission efficiency is proportional to the intensity, wherein $A_1 > A_2 > A_3$ since the first emission efficiency is greater than the second emission efficiency, and the second emission efficiency is greater than the third emission efficiency. A problem of color shift may occur since the first emission efficiency, the second emission efficiency, and the third emission efficiency are different (that is, the first intensity $A_1$, the second intensity $A_2$, and the third intensity $A_3$ are different).

In the present embodiment, the problem of color shift is improved by the diffraction component 30.

Referring to FIG. 1, the diffraction component 30 is on a side of the optical waveguide 40 away from the display panel 20. The diffraction component 30 includes a first diffraction group 31 and a second diffraction group 32 arranged to be separate from each other. The first diffraction group 31 is configured to diffract the first color light, the second color light, and the third color light emitted from the display panel 20. The second diffraction group 32 is configured to diffract the first color light, the second color light, and the third color light diffracted by the first diffraction group 31, so that the holographic images can be generated. The optical waveguide 40 is configured to guide the first color light, the second color light, and the third color light in the display panel 20, the first diffraction group 31, and the second diffraction group 32.

Referring to FIG. 1, the first diffraction group 31 includes a first diffraction element 311, a third diffraction element 313, and a second diffraction element 312 between the first diffraction element 311 and the third diffraction element 313. The first diffraction element 311 is on a side of the second diffraction element 312 away from the display panel 20. In the present embodiment, the first diffraction element 311, the second diffraction element 312, and the third diffraction element 313 are diffraction gratings. The first diffraction element 311 is configured to diffract the first color light, the second diffraction element 312 is configured to diffract the second color light, and the third diffraction element 313 is configured to diffract the third color light.

In the present embodiment, the first diffraction element 311 mainly diffracts the first color light, but the second color light and the third color light both pass through the first diffraction element 311, so the first diffraction element 311 also diffracts the second color light and the third color light. A diffraction effect of the first diffraction element 311 on the first color light is much greater than a diffraction effect of the first diffraction element 311 on each of the second color light and the third color light. Similarly, the second diffraction element 312 mainly diffracts the second color light, but diffracts the first color light and the third color light as well. The second diffraction element 312 has a much greater diffraction effect on the second color light than a diffraction effect of the second diffraction element 312 on each of the first color light and the third color light. The third diffraction element 313 mainly diffracts the third color light, but diffracts the first color light and the second color light as well, wherein a diffraction effect of the third diffraction element 313 on the third color light is much greater than a diffraction effect of the third diffraction element 313 on each of the first color light and the second color light.

In relation to the first color light, a total diffraction efficiency of the first diffraction element 311, the second diffraction element 312, and the third diffraction element 313 is defined as a first diffraction efficiency of the first diffraction group 31. In relation to the second color light, a total diffraction efficiency of the first diffraction element 311, the second diffraction element 312, and the third diffraction element 313 is defined as a second diffraction efficiency of the first diffraction group 31. In relation to the third color light, a total diffraction efficiency of the first diffraction element 311, the second diffraction element 312, and the third diffraction element 313 is defined as a third diffraction efficiency of the first diffraction group 31.

The first diffraction efficiency of the first diffraction group 31 is defined as $\eta_1\%$, wherein the first intensity of the first color light diffracted by the first diffraction group 31 is defined as $A_{11}$. The second diffraction efficiency of the first diffraction group 31 is defined as $\eta_2\%$, wherein the second intensity of the second color light diffracted by the first diffraction group 31 is defined as $A_{22}$. The third diffraction efficiency of the first diffraction group 31 is defined as $\eta_3\%$, the third intensity of the third color light diffracted by the first diffraction group 31 is defined as $A_{33}$. Then: $A_{11} = A_1 * \eta_1\%$, $A_{22} = A_2 * \eta_2\%$, $A_{33} = A_3 * \eta_3\%$.

In the present embodiment, the order of stacking of the first diffraction element 311, the second diffraction element 312, and the third diffraction element 313 thus affects the first diffraction efficiency, the second diffraction efficiency, and the third diffraction efficiency. So, the respective efficiencies of the first, second, and third diffractions can be adjusted by changing the stacking order of the first diffraction element 311, the second diffraction element 312, and the third diffraction element 313. The stacking order of the first diffraction element 311, the second diffraction element 312, and the third diffraction element 313 is determined according to the emission efficiency of the first color light, the second color light, and the third color light. That is, the stacking order of the first diffraction element 311, the second diffraction element 312, and the third diffraction element 313 is determined according to the intensity of the first color light, the second color light, and the third color light. The stacking order of the first diffraction element 311, the second diffraction element 312, and the third diffraction element 313 is set up so that $\eta_1\% < \eta_2\% < \eta_3\%$ when $A_1 > A_2 > A_3$.

Since $A_1 > A_2 > A_3$, $\eta_1\% < \eta_2\% < \eta_3\%$, differences of the first intensity $A_{11}$, the second intensity $A_{22}$, and the third intensity $A_{33}$ are less than differences of the first intensity $A_1$, the second intensity $A_2$, and the third intensity $A_3$.

Therefore, according to the emission efficiency of the first color light, the second color light, and the third color light, the stacking order of the first diffraction element 311, the second diffraction element 312, and the third diffraction element 313 in the diffraction component 30 can be changed so that the diffraction efficiency of the first diffractive element 311, the second diffractive element 312, and the third diffractive element 313 in relation to the first, second, and third colors of light are also changed. The respective intensities of the first, second, and third colors of light are also changed, so as to reduce the differences in the respective intensities of the first, second, and third colors of light, which avoids or reduces the color shift problem of the holographic images generated by the holographic display device 10.

Referring to FIG. 1, the second diffraction group 32 includes a first diffraction element 321, a third diffraction element 323, and a second diffraction element 322 between the first diffraction element 321 and the third diffraction element 323. The first diffraction element 321 is on a side of the second diffraction element 322 away from the display panel 20. The first diffraction element 321, the second diffraction element 322, and the third diffraction element 323 are diffraction gratings. In other embodiments of the present disclosure, the stacking order of the first diffraction element 321, the second diffraction element 322, and the third diffraction element 323 may be different from the stacking order in the first diffraction group 31. The first diffraction element 321 is configured to diffract the first color light emitted from the first diffraction group 31, the second diffraction element 322 is configured to diffract the second color light emitted from the first diffraction group 31, and the third diffraction element 323 is configured to diffract the third color light emitted from the first diffraction group 31. The arrangement of the stacking order of the first diffraction element 321, the second diffraction element 322, and the third diffraction element 323 in the second diffraction group 32 reduces differences in intensities of the first color light, the second light, and the third color light emitted from the second diffraction group 32, which avoids or reduces the color shift problem of the holographic images generated by the holographic display device 10.

It is to be understood, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A holographic display device comprising:
a display panel configured for emitting a first color light having a first emission efficiency and a second color light having a second emission efficiency, the first emission efficiency being greater than the second emission efficiency; and
a diffraction component on an optical path of the first color light and the second color light, the diffraction component configured for diffracting the first color light at a first diffraction efficiency and the second color light at a second diffraction efficiency to generate holographic images;
wherein the first diffraction efficiency is less than the second diffraction efficiency.

2. The holographic display device of claim 1, wherein the display panel is further configured for emitting a third color light having a third emission efficiency, the diffraction component is further configured for diffracting the third color light at a third diffraction efficiency;
wherein the second emission efficiency is greater than the third emission efficiency, and the second diffraction efficiency is less than the third diffraction efficiency.

3. The holographic display device of claim 2, wherein the diffraction component comprises:
a first diffraction element for diffracting the first color light;
a second diffraction element for diffracting the second color light; and
a third diffraction element for diffracting the third color light;
wherein the second diffraction element is between the first diffraction element and the third diffraction element.

4. The holographic display device of claim 3, wherein the diffraction component comprises a first diffraction group and a second diffraction group spaced apart from each other;
the first diffraction group comprises one first diffraction element, one second diffraction element, and one third diffraction element;
the second diffraction group comprises one first diffraction element, one second diffraction element, and one third diffraction element.

5. The holographic display device of claim 4, further comprising an optical waveguide between the display panel and the diffraction component configured for guiding the first color light, the second color light, and the third color light to propagate in the display panel, the first diffraction group, and the second diffraction group.

6. The holographic display device of claim 3, wherein each of the first diffraction element, the second diffraction element, and the third diffraction element is an optical grating.

7. The holographic display device of claim 1, wherein the display panel comprises:
a plurality of light emitting elements configured for emitting the first color light; and
a color conversion layer on an optical path of the first color light configured for converting a part of the first color light into the second color light.

8. The holographic display device of claim 7, wherein the color conversion layer is further configured to convert a part of the first color light into a third color light.

9. The holographic display device of claim 8, wherein the first color light is blue light, the second color light is green light, and the third color light is red light.

10. The holographic display device of claim 7, wherein the color conversion layer comprises quantum dots.

11. A holographic display device comprising:
a display panel configured for emitting an image light for displaying two-dimensional images, the image light comprising at least a first color light having a first emission efficiency and a second color light having a second emission efficiency, the first emission efficiency being greater than the second emission efficiency; and
a diffraction component on an optical path of the first color light and the second color light, the diffraction component configured for diffracting the first color light at a first diffraction efficiency and the second color light at a second diffraction efficiency to generate holographic images, wherein the first diffraction efficiency is less than the second diffraction efficiency.

12. The holographic display device of claim 11, wherein the display panel is further configured for emitting a third color light having a third emission efficiency, the diffraction component is further configured for diffracting the third color light at a third diffraction efficiency;
wherein the second emission efficiency is greater than the third emission efficiency, and the second diffraction efficiency is less than the third diffraction efficiency.

13. The holographic display device of claim 12, wherein the diffraction component comprises:
   a first diffraction element for diffracting the first color light;
   a second diffraction element for diffracting the second color light; and
   a third diffraction element for diffracting the third color light;
   wherein the second diffraction element is between the first diffraction element and the third diffraction element.

14. The holographic display device of claim 13, wherein the diffraction component comprises a first diffraction group and a second diffraction group spaced apart from each other;
   the first diffraction group comprises one first diffraction element, one second diffraction element, and one third diffraction element;
   the second diffraction group comprises one first diffraction element, one second diffraction element, and one third diffraction element.

15. The holographic display device of claim 14, further comprising an optical waveguide between the display panel and the diffraction component configured for guiding the first color light, the second color light, and the third color light to propagate in the display panel, the first diffraction group, and the second diffraction group.

16. The holographic display device of claim 13, wherein each of the first diffraction element, the second diffraction element, and the third diffraction element is an optical grating.

17. The holographic display device of claim 13, wherein the display panel comprises:
   a plurality of light-emitting elements configured for emitting the first color light; and
   a color conversion layer on an optical path of the first color light configured for converting a part of the first color light into the second color light.

* * * * *